United States Patent [19]

Saito

[11] 4,181,486

[45] Jan. 1, 1980

[54] APPARATUS FOR PRODUCING THE INSULATING LAYER OF A COAXIAL CABLE

[75] Inventor: Yasunori Saito, Yokohama, Japan

[73] Assignee: Sumitomo Electric Industries, Ltd., Osaka, Japan

[21] Appl. No.: 906,173

[22] Filed: May 15, 1978

[30] Foreign Application Priority Data

May 17, 1977 [JP] Japan ........................ 52-57273

[51] Int. Cl.² .............................. B29F 3/04

[52] U.S. Cl. .............................. 425/113; 156/55; 156/56; 156/244.13; 264/174; 264/177 R; 425/381; 425/465

[58] Field of Search .............. 425/113, 114, 381, 461, 425/465; 264/174, 310, 177 R; 156/47, 55, 56, 244.13, 244.15

[56] References Cited

U.S. PATENT DOCUMENTS

| | | | |
|---|---|---|---|
| 1,902,953 | 3/1933 | Hazell | 425/461 |
| 2,446,057 | 7/1948 | Morin | 425/113 |
| 2,456,304 | 12/1948 | Morin | 264/174 |
| 2,834,047 | 5/1958 | Morin | 425/113 |
| 3,411,182 | 11/1968 | Nevin | 425/113 |
| 3,415,919 | 12/1968 | Kippan | 264/174 |
| 3,685,147 | 8/1972 | Nevin et al. | 264/177 R |
| 3,755,523 | 8/1973 | Straub et al. | 264/177 R |

*Primary Examiner*—Jeffery R. Thurlow

*Attorney, Agent, or Firm*—Sughrue, Rothwell, Mion, Zinn and Macpeak

[57] ABSTRACT

A spiral insulation rib between the inner and outer conductors of a coaxial cable is provided having a rectangular cross section by pointing the extrusion slit approximately in the direction of the spiral winding and by providing side surfaces of the extrusion slit which are concave so that the width of the slit is smallest at the center thereof and gradually increased toward either end.

6 Claims, 6 Drawing Figures

APPARATUS FOR PRODUCING THE INSULATING LAYER OF A COAXIAL CABLE

BACKGROUND OF THE INVENTION

This invention relates to an apparatus for manufacturing a coaxial cable of the type wherein a plastic insulating material is extruded between inner and outer conductors to form one or more spiral spacer ribs, and more particularly, to an apparatus for producing spiral insulating spacer ribs having a rectangular cross section around the outer periphery of the inner conductor.

In conventional apparatus, molten softened insulating material having low dielectric constant such as polyethylene is extruded from a rectangular slit formed in a rotating nozzle, to wrap around a running inner conductor and thereby obtain a spiral spacer rib having a rectangular cross section.

FIG. 1 shows a conventional apparatus for producing a spiral spacer rib, wherein a molten plastic is spirally formed around a running inner conductor 1 driven by a capstan (not shown). The molten plastic is introduced into a rotating nozzle 5 disposed in a cross head 4 by an extruder 3, and is extruded from a slit 6 formed in the nozzle 5 to obtain spiral rib 2. The nozzle 5 is rotated at a constant speed by a motor 8 to which an endless belt 9 is provided to transmit the rotation of the motor to a pulley 7 integral with the nozzle 5. Further, a screw 3' disposed within the extruder 3 is rotated at a constant speed to extrude a uniform amount of molten plastic with time, so that the pitch of the spiral rib 2 is determined by the relationship between the rotation speed of the nozzle 5 and running speed of the inner conductor 1.

As shown in FIGS. 2(*a*) and 2(*b*), in the conventional apparatus, the slot 6 is opened in a direction parallel to the axial direction of the inner conductor 1, and therefore the plastic extruding direction is parallel to the axial direction of the inner conductor 1, and disadvantageously, as mentioned above, the extruded plastic is spirally formed around the inner conductor by the rotation of the nozzle 5. However, according to this apparatus, if the pitch of the spiral rib is set small, the rib may be curved in cross-section with respect to a radial direction of the inner conductor, since the spirally winding direction of the rib 2 is much different from the extruding direction. Further, the molten plastic flowing conditions at positions corresponding to the ridge, root and central portions of the rib are different from one another when the plastic is extruded from a rectangular slit due to frictional resistance caused by the slit walls, so that the extruded amount from the slit 6 is not uniform in cross section, resulting in the cross sectional shape of the rib being in the form of a convex lens as shown in FIG. 2(*a*).

Such a spiral rib reduces the contacting area between the root and ridge portions thereof and inner and outer conductors, respectively, and therefore the mechanical strength of the insulation is deteriorated, and the coaxial cable obtained would not exhibit sufficient mechanical reliability and desirable electrical characteristics.

SUMMARY OF THE INVENTION

It is therefore an object of the present invention to overcome the above-mentioned drawbacks and to provide an improved apparatus for producing an insulating layer of a coaxial cable wherein uniform quality is obtainable and contact between the insulating layer and the conductors is maintained at a maximum.

Briefly, in accordance with the present invention the extrusion slit is directed in the approximate direction of the spiral winding direction, so that the extrusion surface of the rotating nozzle has a predetermined angle with respect to a center axis of the inner conductor. Further, the extrusion slit is formed to have arcuate side walls so as to narrow the central width thereof to provide a spiral rib having a rectangular cross section.

BRIEF DESCRIPTION OF THE DRAWINGS

In the drawings:

FIG. 2(*a*) shows a side view of the essential part of the conventional apparatus;

FIG. 2(*b*) shows a cross-section taken along the line I—I of FIG. 2(*a*);

FIG. 3(*b*) shows a cross-section taken along the line II—II of FIG. 3(*a*)

DETAILED DESCRIPTION OF THE INVENTION

Figures 1, 2A, 2B:
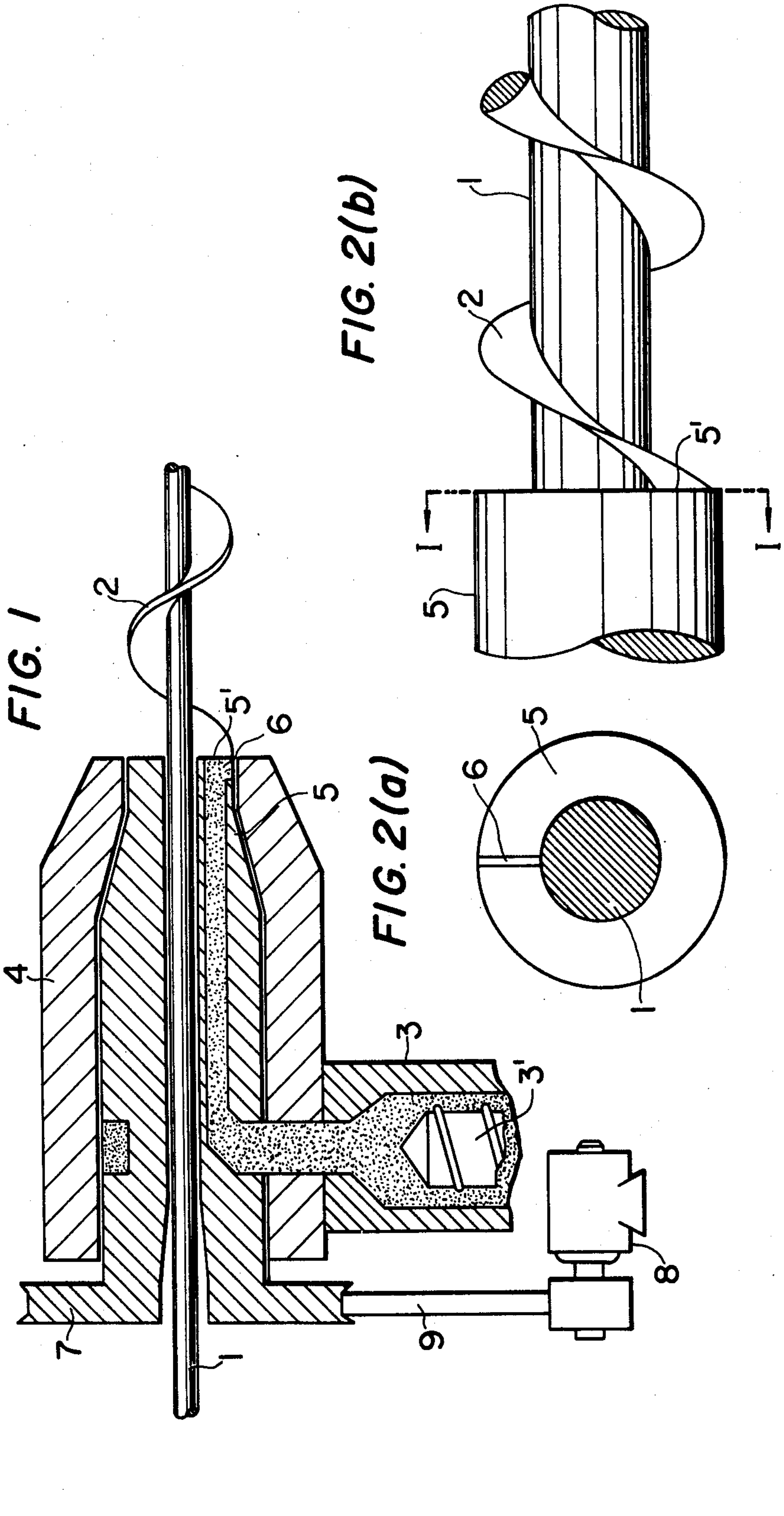
FIG. 1 shows a schematic view of a conventional apparatus for producing a spiral rib of a coaxial cable.
Figure 3A:
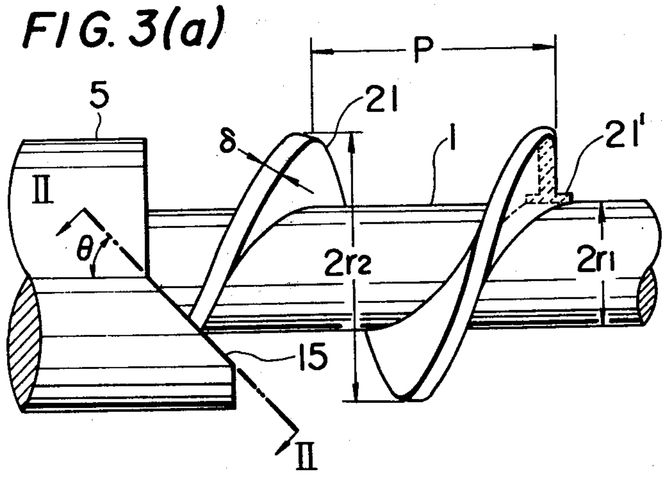
FIG. 3(*a*) shows a schematic view according to the present invention.
Figure 3B:
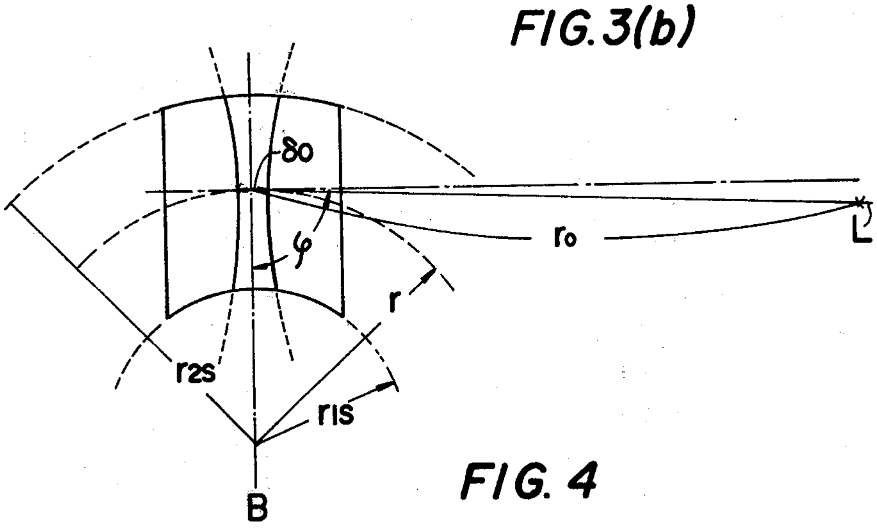

The present invention will now be described in detail with reference to FIGS. 3(*a*), 3(*b*) and 4, wherein like parts and components are designated by the same reference numerals and characters as those shown in FIGS. 1 and 2. The central feature of the present invention resides in an extrusion surface 5' of a rotation nozzle 5 and the configuration of an extrusion slit 15 formed in the extrusion surface 5', that is, the extrusion surface is inclined to have an angle $\theta$ ($0<\theta<\pi/2$) with respect to a central axis of an inner conductor 1 as shown in FIG. 3(*a*), and the slit 5 is formed to have arcuate side surfaces wherein the center portion thereof is the narrowest to have a concave shape as shown in FIG. 3(*b*).

According to various experiments, the angle $\theta$ is determined by the following formula:

$$\theta \approx \tan^{-1}\frac{P}{\pi(r_1+r_2)}$$

wherein

P=pitch of a spiral rib 21

$2r_1$=outer diameter of the inner conductor $2r_2$=outer diameter of the spiral rib 21.

By inclining the extrusion surface so that the spiral rib leaves the extrusion slit in a direction substantially perpendicular to the extrusion surface, no rib curvature occurs with respect to the radial direction of the inner conductor.

Turning to the cross sectional shape of the slit 15, the central portion of the slit 15 along the radial direction of the rotation nozzle 5, that is, at a distance $(r_1+r_2)/2$ measured from the center axis of the inner conductor 1 has a width $\delta_o$ as shown in FIG. 3(*b*).

The relationship between the width $\delta_o$ and the width of the spiral rib 21 is as follows:

$$0.3<\delta_o/\delta<0.5 \qquad (1)$$

This range is obtainable because of the nature of the plastic material. The shape of arcuate side surfaces of the slit having a central width $\delta_o$ is experimentally obtained as follows: The curvature of the slit wall has a radius $r_o$, in the range of $$0.3 < \frac{2r_o\delta_o}{r_2^2 - r_1^2} < 0.5 \quad (2)$$

By the formula (2), $$0.15(r_2^2-r_1^2)/\delta_o<r_o<0.25(r_2^2-r_1^2)/\delta_o$$

The above formula 2 is derived from the principle that the radius $r_o$ is proportional to the height $(r_2-r_1)$ of the spiral rib and is in inversely proportional to the width $\delta$ of the spiral rib, namely $r_o \simeq K\cdot(r_2-r_1)/\delta$ The applicant has found that when $(r_2+r_1)/2$ is included in the coefficient K, a desirable rib can be obtained. That is, $$r_o \simeq \frac{r_2 - r_1}{\delta} \cdot \frac{r_1 + r_2}{2} = \frac{r_2^2 - r_1^2}{2\delta}$$

and, therefore, $$\delta \simeq (r_2^2-r_1^2)/2r_o$$

If $(r_2^2-r_1^2)/2r_o$ is included in $\delta$ of the formula (1) the formula (2) is obtained.

The center position of a circle having the radius $r_o$ is on a line L having an angle $\psi$ with respect to a bisect line B of the slit, wherein the intersecting point of the lines L and B is positioned at the distance r which is the central point of the slit namely, $r=(r_1+r_2)/2$. The angle $\psi$ is experimentally obtained as follows:

$$\psi = \cot^{-1}\frac{(r_1 + r_2)\left[1 - \sqrt{1 - \left(\frac{2\delta_o}{r_1 + r_2}\right)^2}\,\right]}{2\delta_o} \quad (3)$$

By providing a radius $r_o$ for the arcuate slit walls, the cross-section of the spiral rib is uniformly obtained in rectangular shape. It is preferable that an intermediate value is selected for $\delta_o$ in formula (1) and for $r_o$ in formula (2) to obtain the most desirable spiral rib.

It should be noted that in the conventional apparatus, the dimensions of the extrusion surface 5' and the slit 6 are not in the range defined by formulae (1) and (2) since $\theta=\pi/2$ and $r_o=\infty$ (infinity) for the conventional apparatus.

Alternatively, the arcuate curvature of the slit walls providing the narrowest slit width at the center portion thereof could be obtained by the following hyperbolic function in Cartesian coordinates, wherein horizontal axis X includes the center of the inner conductor and vertical axis Y coincides with the bisect line B.

$$\left.\begin{array}{l} 0.3 < \frac{\delta_o}{\delta} < 0.5 \\[2ex] \frac{X^2}{\left(\frac{\delta_o}{2}\right)^2} - \frac{\left[Y - \left(\frac{r_{1s} + r_{2s}}{2}\right)\right]^2}{\left(\frac{r_{2s} - r_{1s}}{2}\right)^2} = 1 \end{array}\right\} \quad (4)$$

in which $2r_{2s}$: outer diameter of the slit $2r_{1s}$: inner diameter of the slit which is approximately the same as the diameter of the inner conductor therein.

By providing a slit having a curved walls as determined the above formula (4), the uniform rectangular cross section of the spiral rib is obtained as with formulae (1) and (2).

It is possible to widen the outer most and/or inner-most edges of the opening to form an additional thin wall layer as indicated at 21' to thereby ensure contact between the rib and the inner and/or outer conductor, whereby the mechanical strength and mechanical reliability of the insulating layer of the coaxial cable is further promoted.

Figure 4:
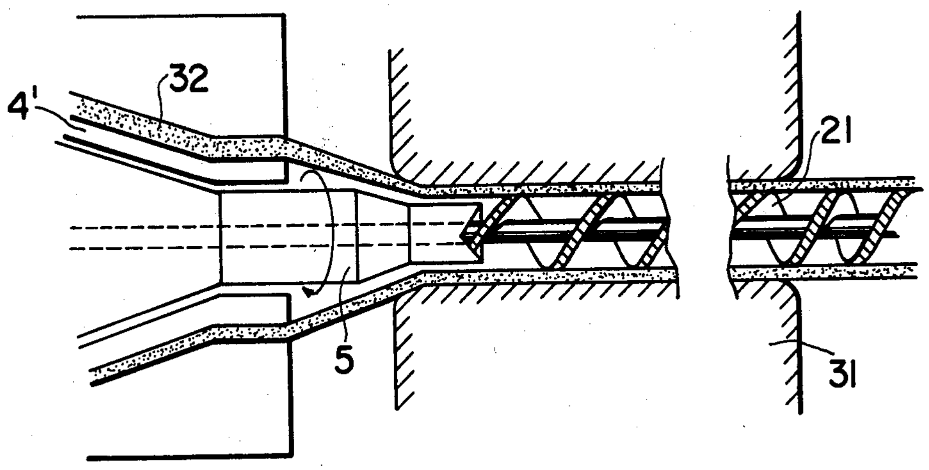
FIG. 4 shows a schematic view according to the present invention, wherein an outer sheath insulation is simultaneously formed.

According to the present invention, it is also possible to simultaneously extrude a tubular insulating sheath while forming the spiral rib in order to obtain a sheath integral with the spiral rib. In this case, an additional plastics passage 32 communicable with the extruder is provided within the cross head 4' as shown in FIG. 4. A sizing die 31 is provided to uniformly control the sheath diameter through its length and to melt bond the rib and the sheath. According to experiments, the tip end of the rotation nozzle 5 is preferably positioned in the sizing die 31, and therefore the outer diameter $2r_{2s}$ of the slit is preferably 1 to 3 mm smaller than the inner diameter of the sheath (outer diameter of the spiral rib $2r_2$). Furthermore, problem of eccentricity can be prevented if the inner diameter of the slit $2r_{1s}$ is 0.2 to 0.5 mm larger than the outer diameter of the inner conductor $2r_1$.

What is claimed is:

1. In an apparatus for forming a spiral rib of an insulating material between the inner and outer conductors of a coaxial cable, said apparatus including a cross head and a rotation nozzle disposed in the cross head and rotated at a predetermined rotational speed about the axis of said inner conductor and having an extrusion slit in an extrusion surface thereof for extruding a spiral rib of molten plastic insulating material onto the inner conductor as the latter runs through said nozzle at a predetermined longitudinal speed, the improvement comprising:

said extrusion surface of said rotation nozzle being inclined with respect to a center axis of the inner conductor so that the extruded spiral rib is carried away from said slit by said inner conductor in in a direction substantially perpendicular to said extruding surface.

2. An apparatus as defined in claim 1, wherein said extrusion surface is inclined at an angle $\theta$ with respect to the center axis of said inner conductor given by the formula $$\theta = \tan^{-1}\frac{P}{\pi(r_1 + r_2)}$$

in which

P=pitch of the spiral rib, $2r_1$=a diameter of the inner conductor, and $2r_2$=an outer diameter of the spiral rib.

3. An apparatus as defined in claim 1, wherein said extrusion slit is formed to have symmetrical concave side surfaces so that the width of said slit is smallest at the central portion thereof and gradually increases toward the radially innermost and outermost directions.

4. An apparatus as defined in claim 3, wherein the width of said central portion of the slit and the wall thickness of the spiral rib have a relationship shown by the formula $$0.3 < \delta_o/\delta < 0.5$$

in which $\delta_o$=width of the central portion of the slit, and $\delta$=wall thickness of the formed spiral rib.

5. An apparatus as defined in claim 3, wherein each side surface of said slit along radial direction of said slit is an arc of a circle and the radius $r_o$ of the circle is in the range shown by the formula $$0.3 < \frac{2r_o\delta_o}{r_2^2 - r_1^2} < 0.5, \quad (2)$$

and wherein the center of said circle is fixed on a line which passes through a bisect point of said central portion having a width $\delta_o$, said line forming an angle $\psi$ with respect to a bisect line of said slit, said angle being shown by the formula $$\psi = \cot^{-1}\frac{(r_1 + r_2)[1 - \sqrt{1 - (\frac{2\delta_o}{r_1 + r_2})^2}\,]}{2\delta_o}$$

6. An apparatus as defined in claim 3, wherein the curvature of each said side surface of said slit is shown by the following formula in Cartesian coordinates, $$\frac{X^2}{(\frac{\delta_a}{2})^2} - \frac{[Y - (\frac{r_{1s} + r_{2s}}{2})]^2}{(\frac{r_{2s} - r_{1s}}{2})^2} = 1$$

in which $\delta$ is in a range given by the formula $0.3 < \delta_o/\delta < 0.5$ and $2r_{1s}$ is the inner diameter of the slit and $2r_{2s}$ is the outer diameter of the slit.

* * * * *